US007406307B2

(12) United States Patent
Manto

(10) Patent No.: US 7,406,307 B2
(45) Date of Patent: Jul. 29, 2008

(54) SYSTEM AND METHOD FOR PROVIDING INTEROPERABLE AND ON-DEMAND TELECOMMUNICATIONS SERVICE

(75) Inventor: Charles L. Manto, Annapolis, MD (US)

(73) Assignee: FreeTech, L.L.C., Annapolis, MD (US)

( * ) Notice: Subject to any disclaimer, the term of this patent is extended or adjusted under 35 U.S.C. 154(b) by 239 days.

(21) Appl. No.: 10/934,092

(22) Filed: Sep. 3, 2004

(65) Prior Publication Data

US 2005/0084081 A1    Apr. 21, 2005

Related U.S. Application Data

(63) Continuation-in-part of application No. 10/234,840, filed on Sep. 5, 2002, now Pat. No. 6,788,771, which is a continuation-in-part of application No. 09/942,930, filed on Aug. 31, 2001, now Pat. No. 6,584,183.

(51) Int. Cl.
*H04M 11/00* (2006.01)

(52) U.S. Cl. .............. 455/406; 379/114.05; 379/114.01

(58) Field of Classification Search ................................
379/114.23–114.25, 121, 144, 121.2; 455/406
See application file for complete search history.

(56) References Cited

U.S. PATENT DOCUMENTS

| 5,359,642 | A | * | 10/1994 | Castro | ................... 379/121.01 |
|---|---|---|---|---|---|
| 5,825,863 | A | * | 10/1998 | Walker | ................... 379/114.2 |
| 5,942,986 | A | * | 8/1999 | Shabot et al. | ............... 340/7.29 |
| 6,221,010 | B1 | * | 4/2001 | Lucas | ......................... 600/300 |
| 6,381,317 | B1 | * | 4/2002 | Bala et al. | ............... 379/114.23 |
| 6,826,405 | B2 | * | 11/2004 | Doviak et al. | ................ 455/445 |

* cited by examiner

*Primary Examiner*—Duc Nguyen
*Assistant Examiner*—Wayne Cai
(74) *Attorney, Agent, or Firm*—Greenberg Traurig LLP; Richard E. Kurtz

(57) ABSTRACT

The present invention relates in general to the field of voice and data communications, and in particular, to a novel system for providing interoperable on-demand communications and services across otherwise incompatible narrowband voice and broadband systems. The system is also based on sponsored or universal communications services supported by interactive communications between sponsors and service providers and their respective databases of business rules.

1 Claim, 18 Drawing Sheets

Illustration of layered sponsored services

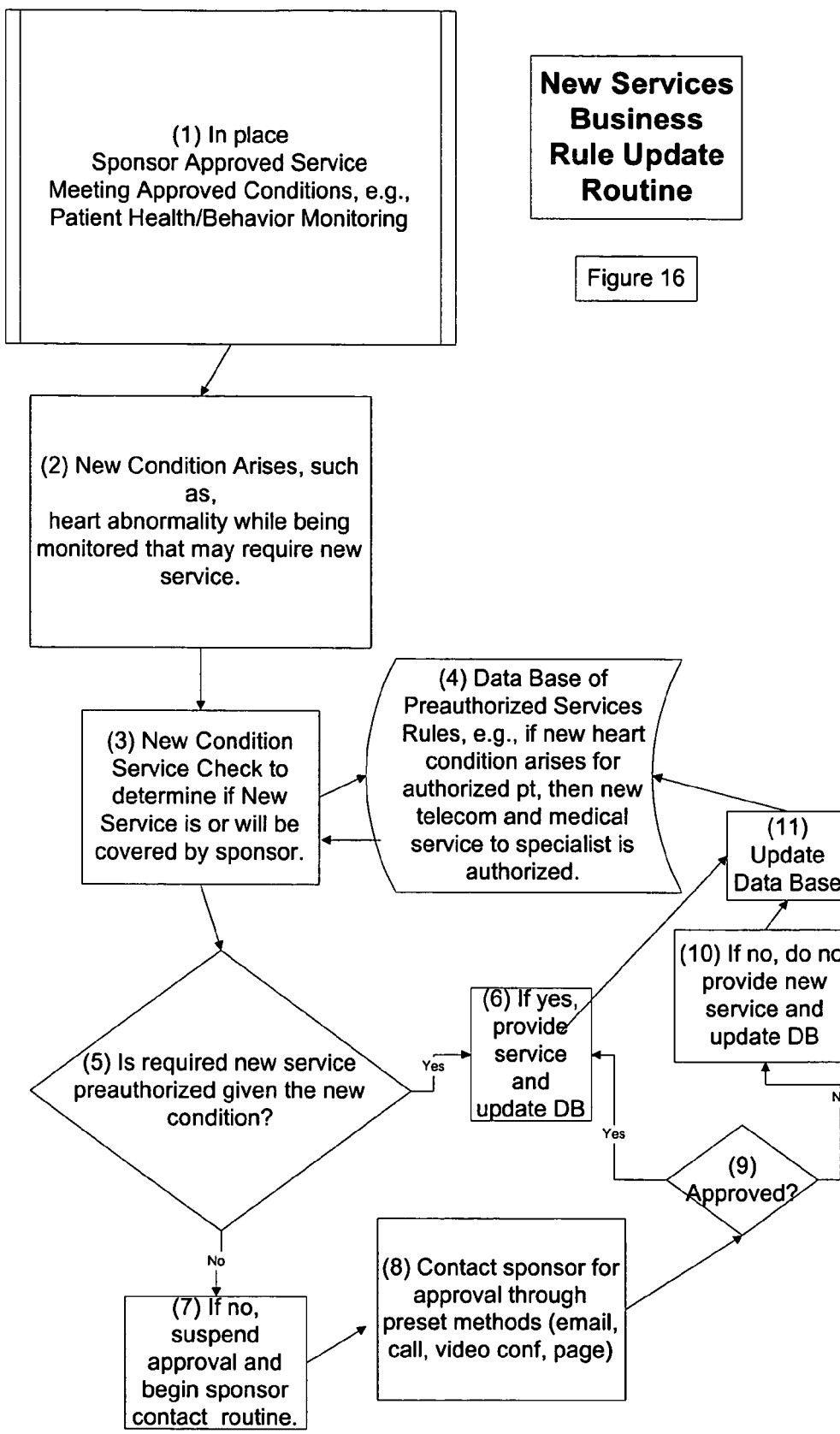

SYSTEM AND METHOD FOR PROVIDING INTEROPERABLE AND ON-DEMAND TELECOMMUNICATIONS SERVICE

CROSS-REFERENCE TO RELATED APPLICATIONS

This application is a continuation-in-part of U.S. patent application Ser. No. 10/234,840, filed Sep. 5, 2002 now U.S. Pat. No. 6,788,771, which is a continuation-in-part of U.S. patent application Ser. No. 09/942,930, filed Aug. 31, 2001 now U.S. Pat. No. 6,584,183, the entire disclosures of which are incorporated herein by reference in their entirety.

This application includes material which is subject to copyright protection. The copyright owner has no objection to the facsimile reproduction by anyone of the patent disclosure, as it appears in the Patent and Trademark Office files or records, but otherwise reserves all copyright rights whatsoever.

FIELD OF THE INVENTION

The present invention relates in general to the field of voice and data communications, and in particular, to a novel system for providing interoperable on-demand communications and services across otherwise incompatible narrowband voice and broadband systems.

BACKGROUND OF THE INVENTION

Over the years, worldwide consideration has been given to two problems. The first is the universal service problem—the desirability of providing telephone or other communication service to those who cannot afford to pay and maintain telephone or other communications service. The second problem is that of immediate and interoperable public safety communications.

Networks are significantly more valuable as more users are able to use the network. However, the lack of universal service is a barrier to economic participation by those lacking service. Societal benefits of having even the poorest people on the public telecommunications network are so significant that the U.S. Telecommunications Act of 1996 makes special provisions for universal service as part of the Act, including mechanisms to implement subsidized activities. In addition to the Act, many states have life-line services which subsidize telecommunications services for users who meet certain low income tests. Emergency 911 services and prospective on-demand broadband 911 services desire free participation of callers into networks that might otherwise require fees.

In the case of public safety communications, emergency service authorities continue to face the problem of interoperable voice communications as different radio communications spectrum is used to support different public safety voice systems. Different units of government and other public entities often have difficulty communicating with each other by voice within one local jurisdiction, e.g., a county, as well as with peers in adjoining counties, states, across a country, or beyond national boundaries.

At the time of this filing, many of these same public safety radios do not interoperably support data or video. The interoperability problem has been continually addressed by organizations such as the National Task Force on Interoperability of the United States, an association with members that include: the International Association of Chiefs of Police, the International Association of Fire Chiefs, the International City/County Management Association, the National Associations of Counties, the National Association of State Chief Information Officers, the National Association of State Telecommunications Directors, the National Conference of State Legislatures, the National Criminal Justice Association, the Emergency Management Association, the National Governors Association, the National League of Cities, the National Public Safety Telecommunications Council, the National Sheriffs' Association, the Council of State Governments, and the United States Conference of Mayors.

There are two primary interoperability problems. The first problem is when users of various wireless narrowband radio systems need to speak to others using another wireless narrowband radio of another frequency. The second problem is when users of a wireless narrowband radio system need to communicate with a user that does not have access to that same system, but does have access to another form of communication such as broadband, another incompatible narrowband system, or a traditional phone system.

In many emergency services scenarios, a crisis may develop that was not anticipated. If communications are to be effective in resolving the crises, they need to be timely and often immediate. Further, the communications must be interoperable between all of these parties, even among those who could not be anticipated as needing to be included in the network. Typically, these unanticipated participants do not have the time to procure and deploy additional equipment. Thus, a method to connect users of disparate systems is desired.

Since many users may be added during the crisis, it may be difficult to arrange for payments of funds or the establishment of credit necessary for the users to participate in these emergency services and networks in a timely manner. In some cases, the users may not be able to pay at all, even though it may be in the best interest of the community. Failing to provide for the immediate participation of unanticipated parties without the timely ability to prove their means to pay for the services can have very serious consequences.

Internationally, there are continued universal service problems as nations such as the Philippines, China, and the republics of the former Soviet Union try to entice investment in their respective telecommunications infrastructures. In these emerging markets, the number of telecommunications lines per capita is much smaller. Because market-based solutions to the universal service problem in these markets are lacking, capital for network infrastructure is limited. Providing emergency services in these environments is even more difficult and all the more necessary. Linking the economic and social benefits of sponsors and users by these means can provide more than just incremental service to users. This linkage can provide substantial infrastructure as well as services to users since it provides substantial services and benefits to sponsors who are then motivated to provide infrastructure and services for users who can not afford to pay for those benefits. Service providers, projecting the involvement of sponsors, can make it possible for new infrastructure and services to be deployed that would not otherwise be justified by user demand and user ability to pay.

History is replete with stories of radio systems that cannot communicate with each other. What initially seem like simple solutions fail in the field. For example, during Desert Storm in the early 1990s, the some countries used radios that were incompatible with those of other military services despite expectations of cooperation. Some European troops were not only unable to communicate with others, they interfered with US radio systems. Police, fire, and EMS personnel often have difficulties communicating in the field.

Many efforts have been made to develop common standards for interoperability of radio systems in recent decades. Unfortunately, these approaches provide limited utility, very limited capability for external system interconnection, and are generally not backward compatible with older analog radio systems. The interoperability standards also do not address integration of radio systems with a wide variety of voice communication system not based on the use of radio. What is needed is an automated system that supports on-demand interconnection between many forms of voice communication systems regardless of their technology.

Many radio systems are now based on digital technology. Digitization has greatly aided the application of security features and improved system immunity to radio frequency interference. However, the integration of unlike radio systems has become much more complex. Converting protocols from one system's syntax to the other is not always possible. Multiple conversions from one protocol to another can degrade signal and voice quality. Furthermore, sharing security keys can present insurmountable management problems. Another problem of integrating systems is the current requirement for human intervention. To interconnect two systems normally requires someone to perform a "patch" whereby the signals of two systems are interconnected, assuming there are no other technical difficulties. This process places a burden on the operators of those systems that can be unacceptably disruptive. The manual process is also limited to a simple connection with conferencing capability limited to the number of successfully manually patched base stations participating at the same time.

SUMMARY OF THE INVENTION

Therefore, there is a need for an improved apparatus and operating methodology that provides a market-based solution to the need for on-demand interoperable, survivable, and immediate emergency communications and services and the related universal service problem including speech activated and speech managed services, often supported by business rules reflecting new circumstance and the choices or behaviors of users. In one embodiment, the system of the present invention provides a means to bridge communications between incompatible narrowband communication systems or one or more narrowband systems with broadband systems or traditional phone systems.

One application provides financial incentives to sponsors so that they would provide free communication services and free applications to their sponsored users. Enabling these applications and services to be provided to users exempt from charges could make it possible to grow the capabilities and reach of public and private networks. In many cases, sponsors may be willing to offer additional services if certain conditions are met or certain choices or behaviors of users are observed. This requires interactive communication between the sponsor and service provider in real time either in person or as part of a predetermined set of circumstances outlined in business rules, which state when additional services are provided by the sponsor. Applications include, but are not limited to, emergency services and telemedicine.

In one embodiment, the invention provides a novel and substantial solution to the problem of providing immediate and interoperable communications including those without proven means to pay and enables sponsors wishing to pay to provide them with interoperable voice, data, and multi-media services. The invention provides an apparatus and a related method for controlling public network switching activity or private or virtual private networks in a manner which makes it possible to provide on demand communications emergency services, of telephone, data, multimedia line or services, whether land, satellite, wireless narrow or broadband, mobile or phone card based interoperably to those whose systems may or may not be compatible with each other.

This system will allow narrowband communications users to communicate with each other and those with broadband communications who normally do not have the narrowband communications systems.

The approach also allows for a method of speech recognition that assists the interoperable communications methodology so that incompatible analog or digital systems can be used to communicate with users of other systems.

In one embodiment of the present invention, a method of operating a telecommunications system comprises the steps of detecting an incoming call or data message from a calling party to a called party, and using a called number or identifier to determine whether the called party is a user for whom service is provided at no charge or substantially no charge. Remotely controlled interactive voice, data, and video services are provided at no charge or substantially no charge. Web portals providing interactive and automated means of sharing data are provided at no charge or substantially no charge. Business rules determine whether a sponsor will pay for a communication, service, or product. A behavior or choice of the calling party is evaluated to determine whether it meets a business rule. The calling party is added on-demand to a new network path or infrastructure. For example, if a user of a sponsored service, such as an educational or training service, passes a grade on a certain exam provided through a telecommunications medium, then that event may trigger the authorized release of additional training material to the sponsored student, or an additional sponsored telecommunications link to additional sponsored telecom services or entertainment, such as a movie.

In another embodiment of the present invention, a method of operating a telecommunications device or network comprises the steps of identifying a prospective user of communications devices, networks, or services, and adding the prospective user to a database of users for whom service is provided at no charge or substantially no charge. A change of personal medical status or environmental status of the user is detected and service or connectivity is provided at no charge or substantially no charge to the user. The service or connectivity is pre-authorized and triggered by the change.

In an additional embodiment, a plurality of telecommunications output signals are aggregated from disparate communications networks into a common audio or video mixer and converted to digital signals so that the signals can be shared with others communicating over a digital network. Voice, data, or video signals are sent from the digital network to other communications networks not on the digital network. A data center is used within a network to offer managed services, wherein network users do not need to provide specialty software or hardware at the user's location. Speech activated commands link the user from one radio frequency to a user of a different radio frequency.

This also makes it possible for the communications user to function as a virtual base station of communications to other communications users. In the embodiment using speech activated inter-connector servers (SAICs), codes are used for allowing the calling party access only to those called parties specified by a sponsor and use of only those services provided by the sponsor. Similarly, the system administrator providing centrally managed services can limit the service access to those parties and services authorized by the paying sponsor.

In yet another embodiment of the present invention, a method for operating a telecommunications device comprises the steps of detecting an outgoing call or data message from a calling party to a called party, and using a called number or identifier to determine whether the called party is a user for whom service is provided at no charge or substantially no charge to the calling party. Remotely controlled interactive voice, data, and video services are provided at no charge or substantially no charge to the calling party. Web portals providing interactive and automated means of sharing data are provided at no charge or substantially no charge to the calling party. At least one business rule determines whether a sponsor will pay for a communication, service, or product based on circumstances which trigger an agreement for the sponsor to pay. A behavior or choice of the user is evaluated to determine whether it meets a business rule which determines whether a communication, service or product will be paid by a sponsor.

In still yet another embodiment of the present invention, a method of operating a telecommunications device comprises the steps of detecting an incoming call or data message from a calling party to a called party, using a called number or identifier to determine whether said called party is a universal service user for whom service is provided at no charge or substantially no charge, generating and sending a message to said calling party offering participation as a sponsor for the current and subsequent calls of this type for the sponsored party; and using the calling number or identifier to determine the quality level of sponsored service approved for that sponsored user.

In yet another embodiment of the present invention, a method of operating a telecommunications device comprises the steps of detecting an incoming call or data message from a calling party to a called party, using a called number or identifier to determine whether said called party is a universal service user for whom service is provided at no charge or substantially no charge, generating and sending a message to said calling party or to a third party offering participation as a sponsor for the current and subsequent calls of this type for the sponsored party, and using codes and speed dial numbers for allowing calling parties access only to those called parties allowed by sponsors to be contacted and only using those services provided to users by the sponsor or sponsors.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

FIG. 16 is an illustration of the interactive nature of the system supported by business rules.

DETAILED DESCRIPTION OF THE PREFERRED EMBODIMENT

Figure 1A:
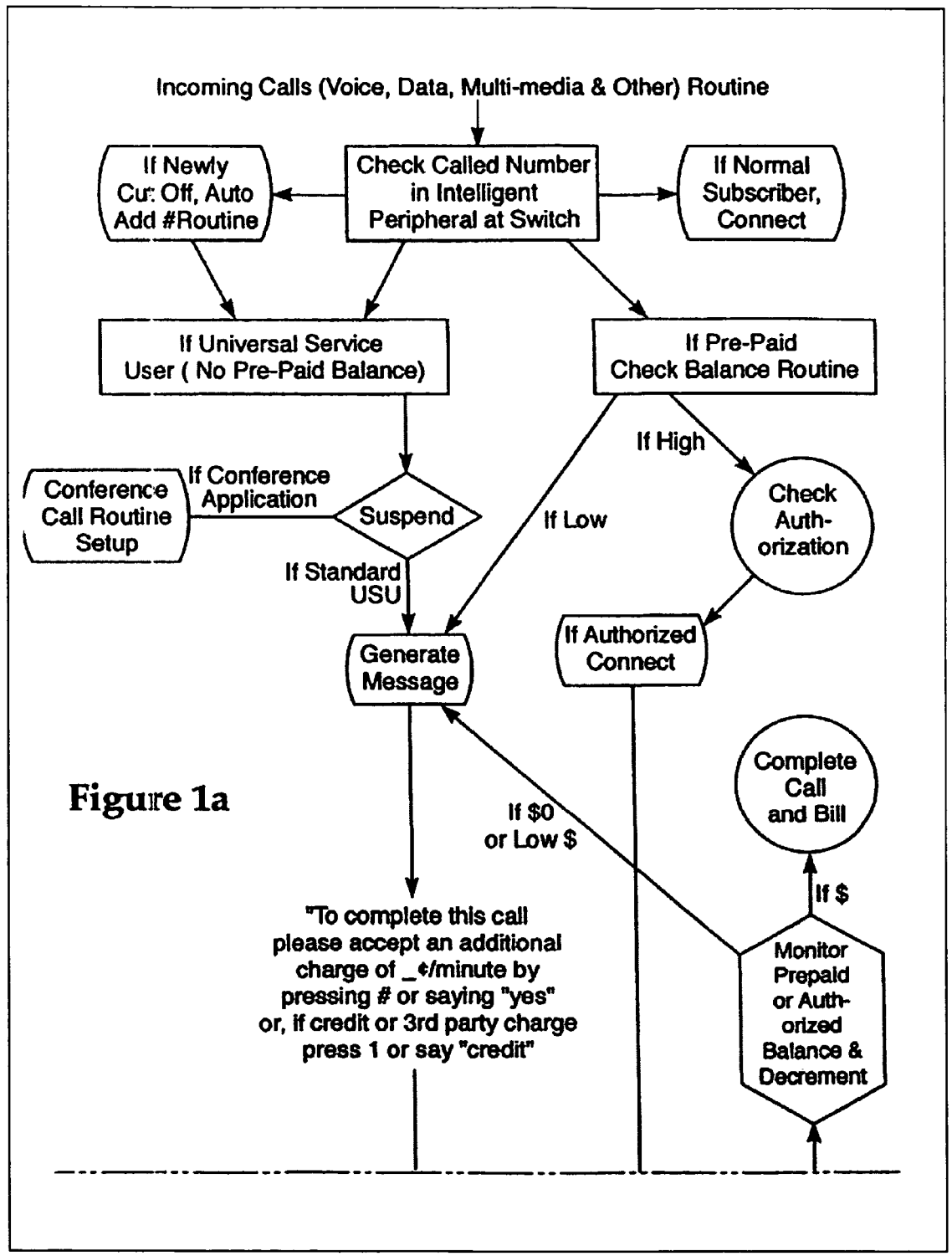
FIG. 1 is a flowchart showing a process for delivering Incoming Calls to a Universal Service User.
Figure 1B:
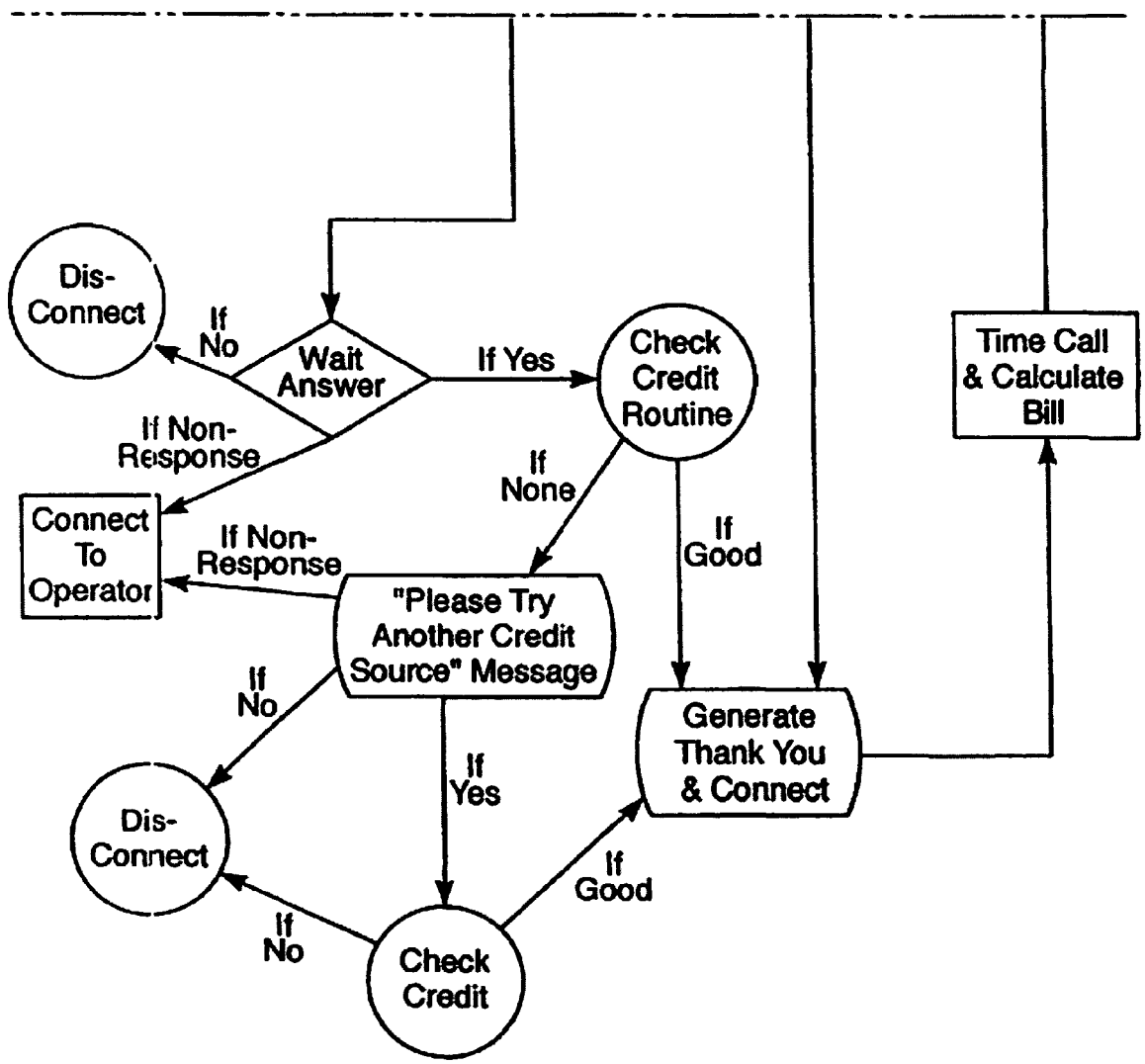
Figure 2A:
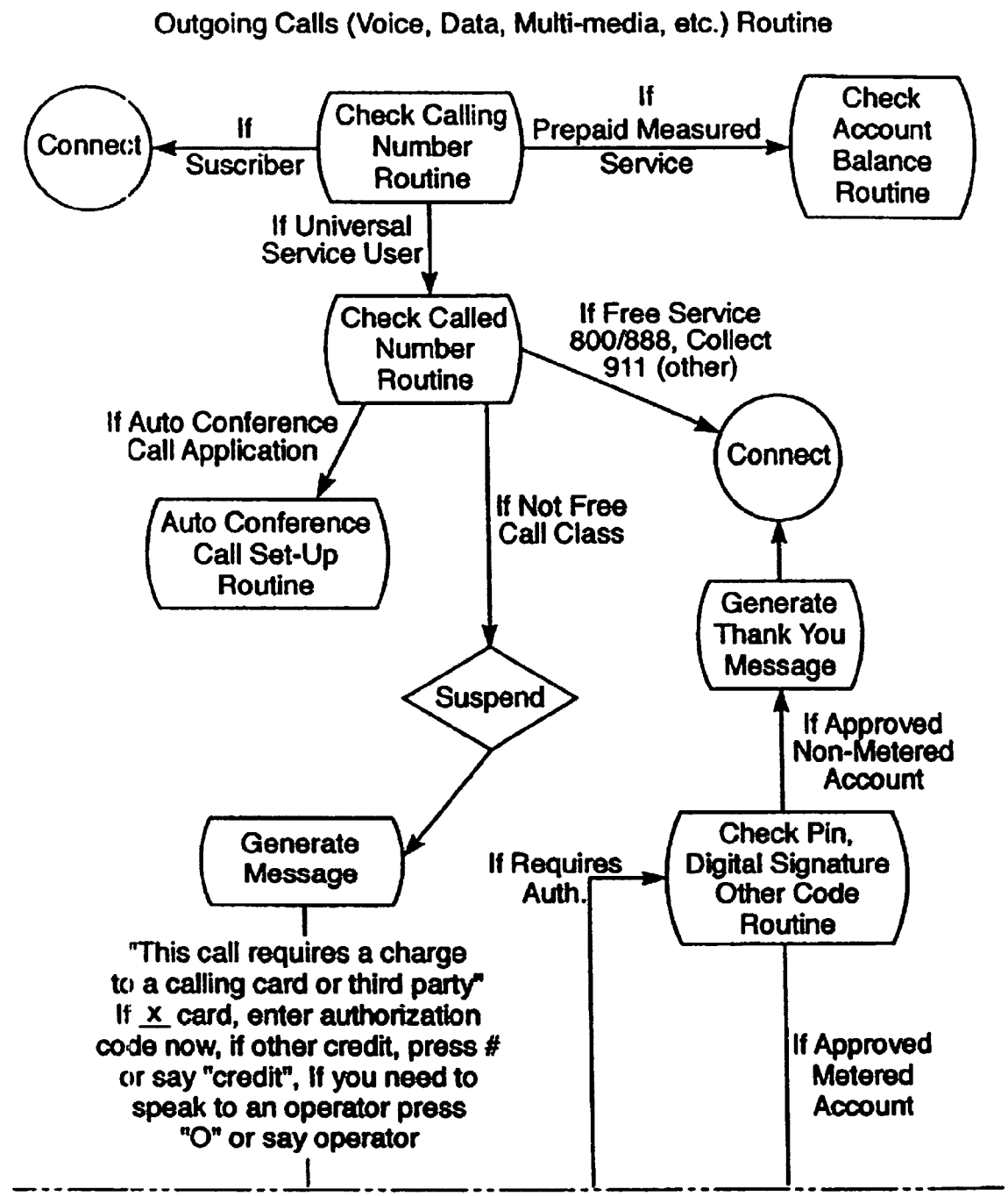
FIG. 2 is a flowchart showing an outbound calling process according to the present invention.
Figure 2B:
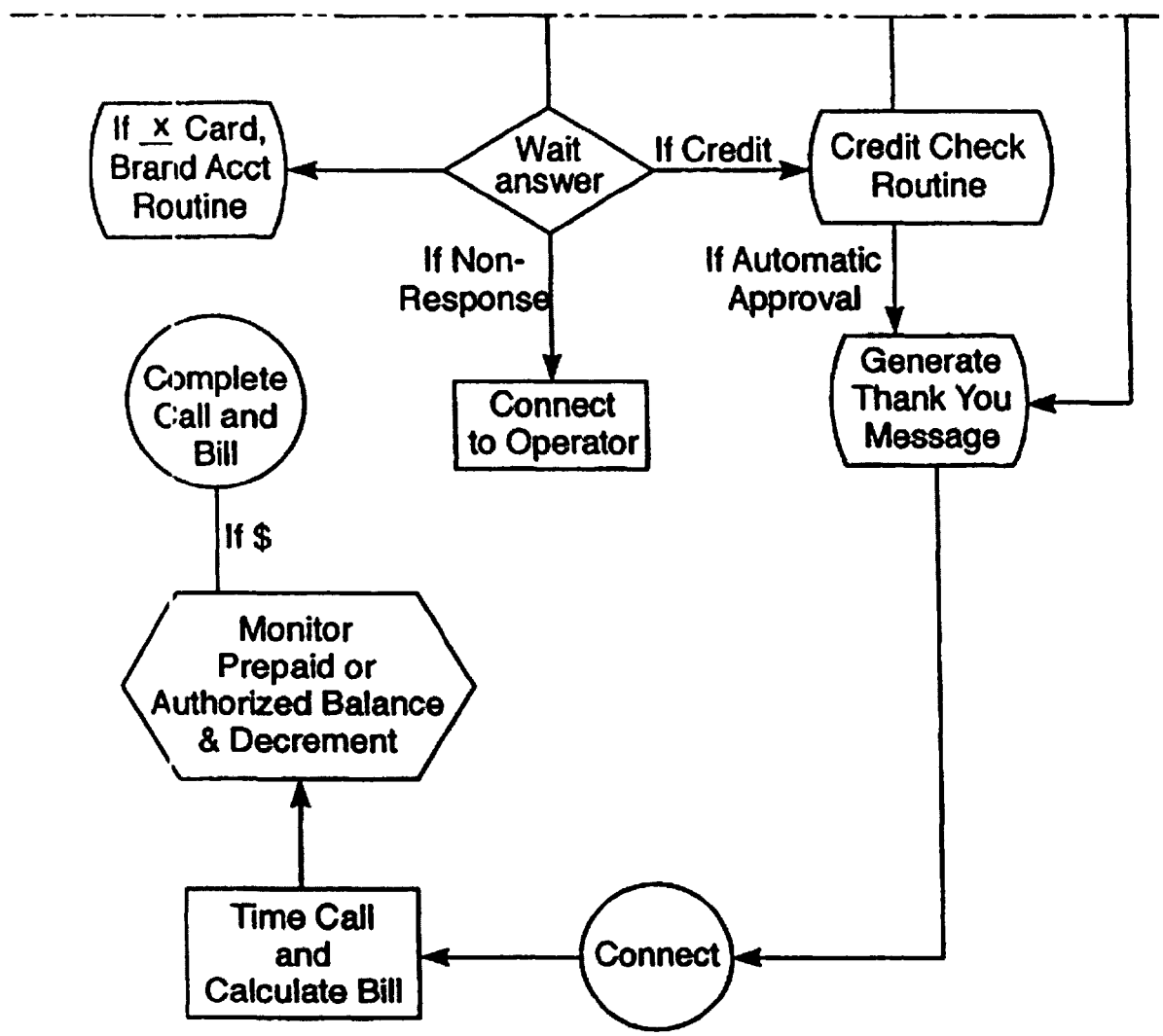
Figure 3:
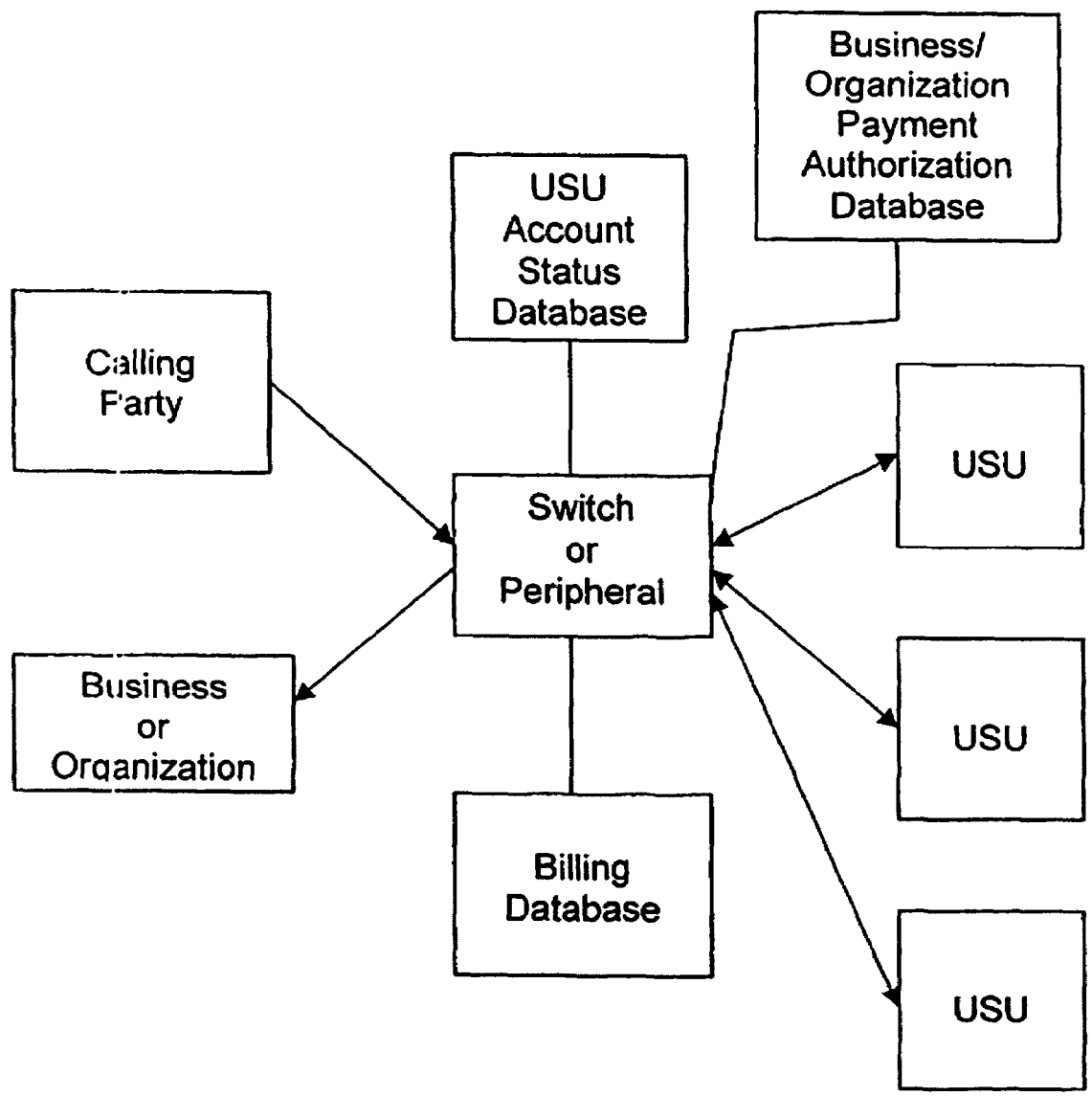
FIG. 3 is an illustration of a simplified block diagram of the preferred embodiment of the switching system according to the present invention.

Reference will now be made in detail to the preferred embodiments of the present invention, examples of which are illustrated in the accompanying drawings.

For the purposes of the present invention, the universal service user is also defined as an "exempt" user or "sponsored" user, and the services are alternately referred to as "universal service," "exempt service," or "sponsored service." "Call" is used either as a voice, data, or multimedia contact.

The present invention provides software operating in routers, telephone central office switches and/or their intelligent peripherals or in private networks or virtual private networks. Such operating software may also be installed in other network devices for wireline and wireless local loop services and long distance services, in user and service provider equipment including switches, PBX's, telephony systems, controlling local area networks, and wide area networks. The software may also provide universal access to portable telephones, personal digital assistants, notebook and laptop computers, communication tabs, pagers and other electronic communications devices, including those that may be considered nanotechnology. The software capabilities are managed from a central point, or decentralized points, or at the edge of the network including the policy or security servers or remote mass storage systems supporting the networks.

One solution to the problems of interoperability is to overlay current emergency communications or telemedicine services with on-demand communications that provide complete voice, data, and video infrastructure and services, allowing for real-time on-demand inclusion of new participants based on sponsored services. This provides interoperable voice, data, and video communications without eliminating prior communications systems and investments by utilizing those technologies and systems along side of the system provided by the invention.

The on-demand interoperable communications not only allows for interoperable communications in voice, data, and video between persons, computer programs, databases, and communications agents, but also provides for more survivable infrastructure and the immediate inclusion of new network and service participants who do not have the means to pay either in the short-term or long term.

The system also provides totally interoperable voice, data, and video services necessary for the immediate provision of emergency services including parties that are not anticipated as being needed to be a part of a communications network.

However, one skilled in the art understands that the inventive concepts can be similarly applied to billing and connection services for other communications networks and their accompanying applications, services or products such as telemedicine, education services or business transactions, and the like.

Telemedicine applications and other on-demand emergency communications may be paid by a sponsor, such as an insurance company or community. A series of interactive communications authorize new and additional sponsored services, which in turn could be more efficiently managed by use of automated business rules. For example, an insurance company may be willing to pay for a number of different communication services, e.g., health care services such as advice and consultation by medical professionals, or other services and products depending on whether a user meets certain criteria. However, an insured party may only be authorized for advanced telemedical observation and diagnosis routines for a previously diagnosed heart irregularity. An observed indicator triggers a need for additional services, and established business rules automatically approve and facilitate the communication capabilities and medical services needed. These business rules enhance the ability of sponsors to provide services to users.

In another example, a sponsored patient is authorized to call his doctor for an appointment and, based on that behavior, the patient will be given additional privileges or services because of the approved behavior. The choice to call at the proper time may authorize certain additional telephone, Internet, or cell phone privileges. A database linked to the business rules also logs additional benefits of services or products for which the user is authorized. A growing database of information, including the business rules, interactions between sponsors and users, and the behaviors of users, enhances the business rules or artificial intelligence rules and allows for more complex services to be approved in an on demand environment.

Figure 4:
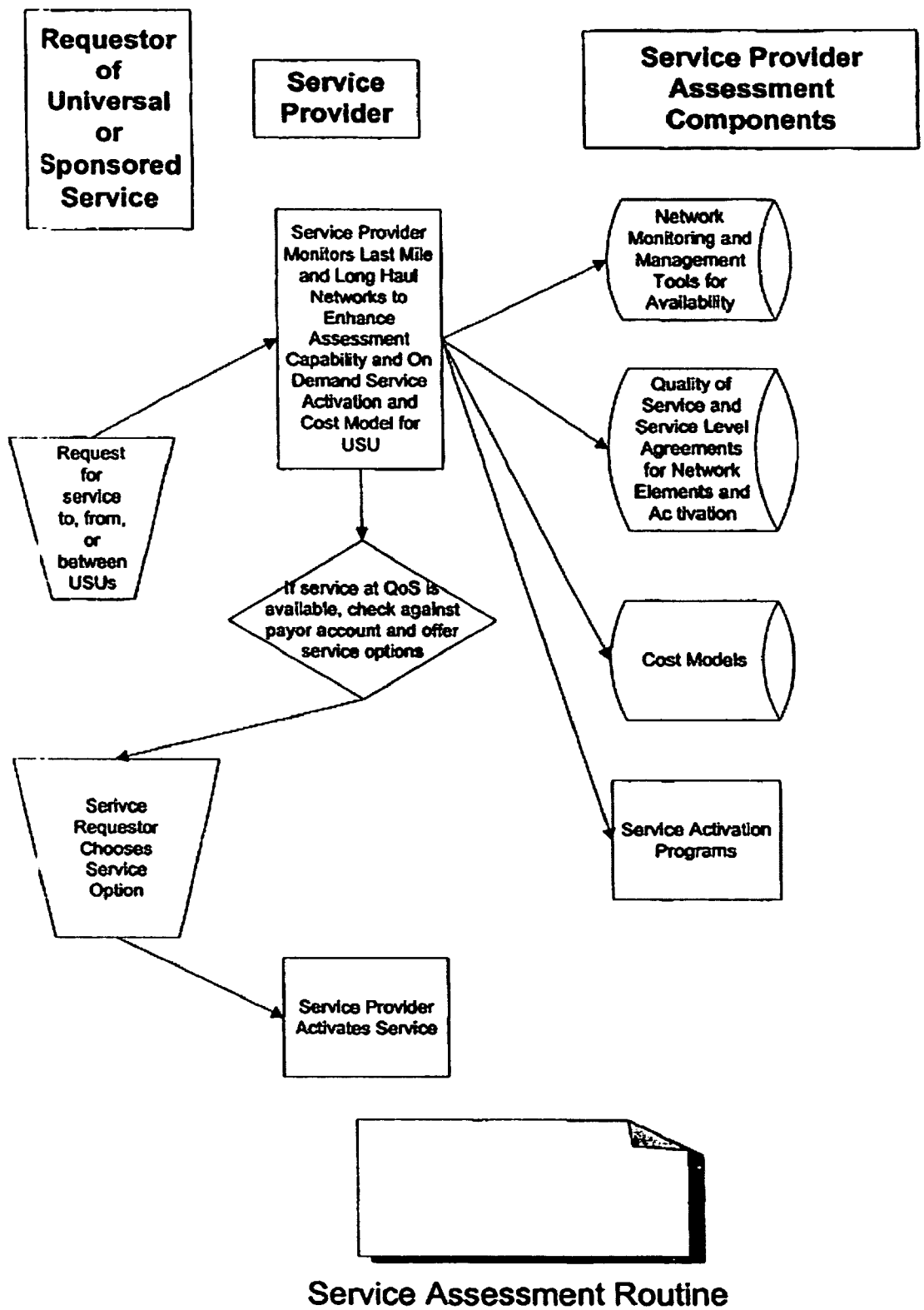
FIG. 4 is an illustration of a simplified block diagram of the preferred embodiment of the sponsored or universal service virtual real time wide band assessment routine.
Figure 5:
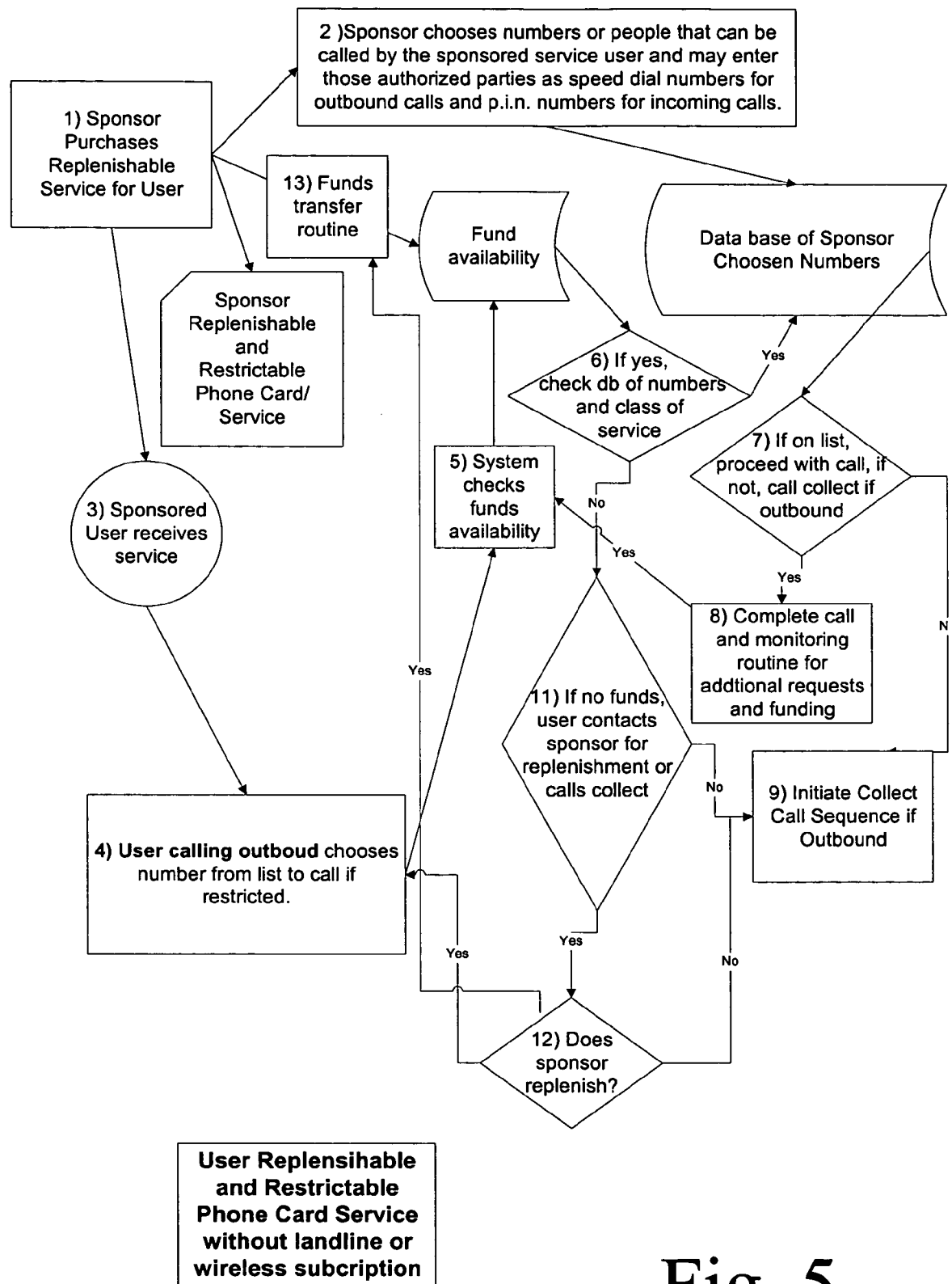
FIG. 5 is a flowchart of the calling process as applied to a phone card or virtual phone card process where sponsors can restrict and replenish accounts for their sponsored users.
Figure 6:
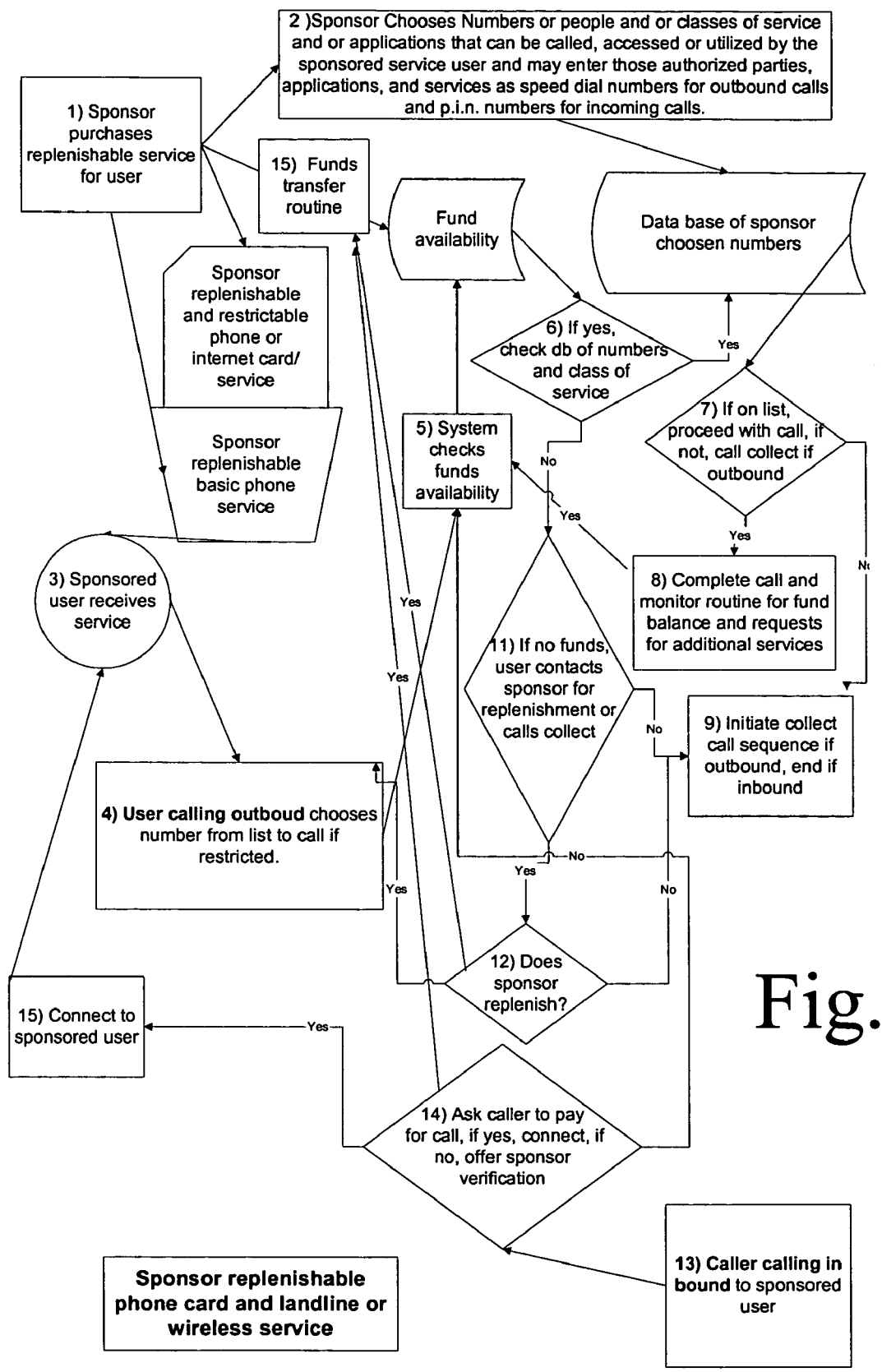
FIG. 6 is a flowchart of the calling process as applied to a combination phone card or virtual phone card with a local phone service subscription.
Figure 7:
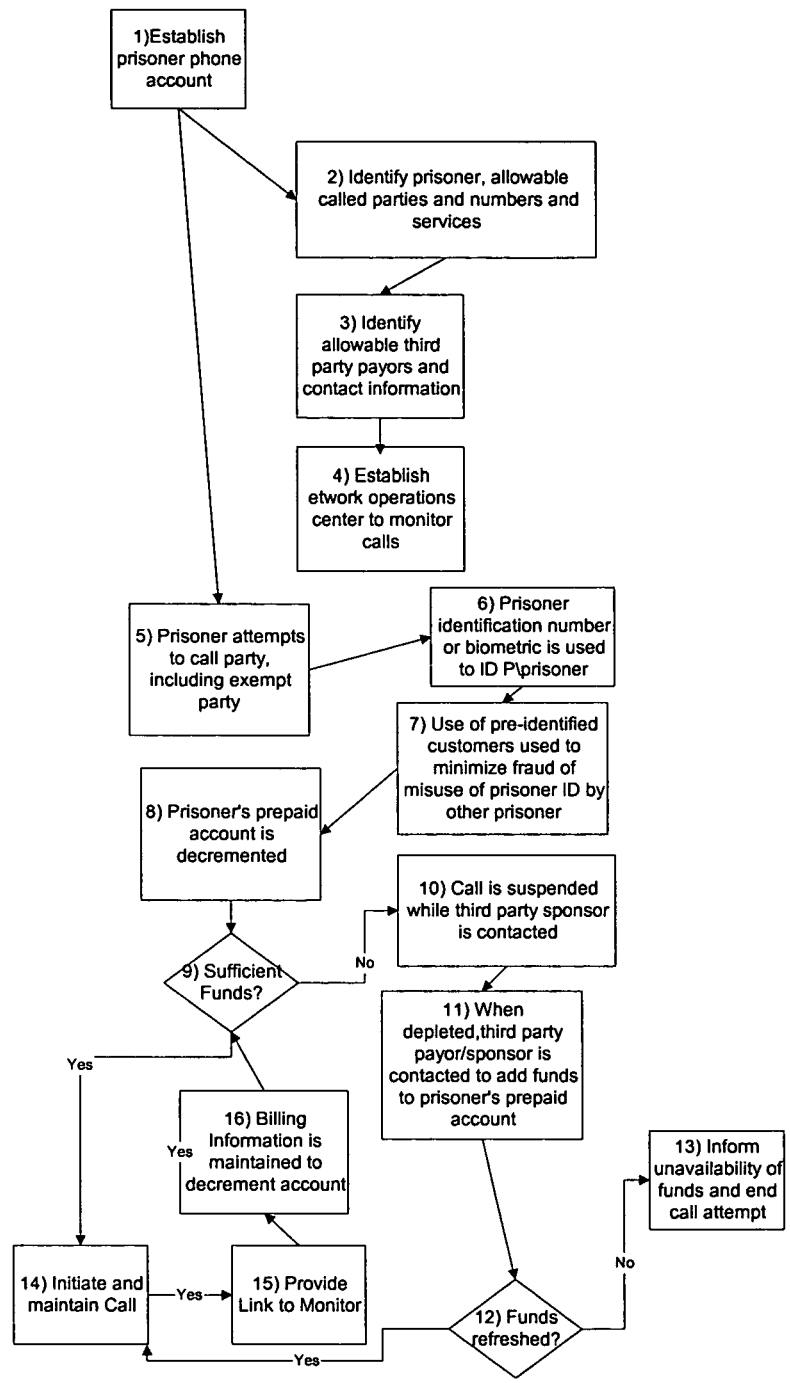
FIG. 7 is a flowchart of the virtual phone card process as it may be applied to monitored and recorded services such as a prison phone service.
Figure 8:
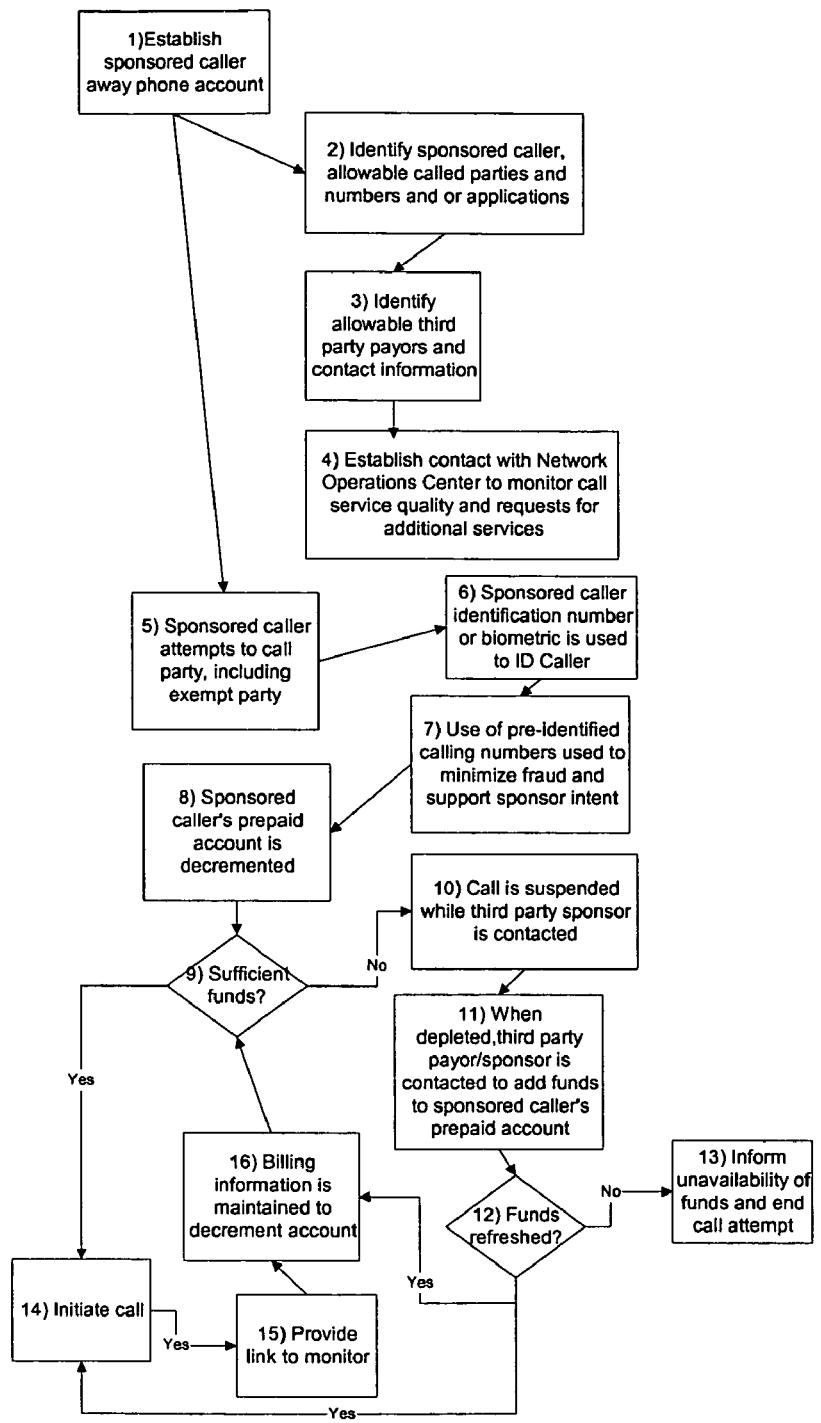
FIG. 8 is a flowchart of the virtual phone card process as it may be applied to non monitored and recorded services such as a college or business campus or users while traveling.

The method for providing on-demand communications include the following steps. The first step is to establish universal service or third party payer services. This provides the capability for sponsors to approve either in advance or in real time, the payment for services of other parties not able to pay or provide credit in a timely manner, as illustrated in FIGS. 1-3 and 5-11. FIG. 4 shows that databases of services and service level agreements can act as business rules to show which initial benefits sponsors will authorize and which subsequent benefits can be used when new circumstances or behaviors trigger the authorization of sponsored services. This allows for on-going interactive communications with the sponsor who can authorize additional services either by being part of the communications link in person, or, through business rules which they previously authorized that can adapt to changing circumstances.

The second step is to provide interactive video services through commonly available software used to manage multiple users. The software is deployed either through a data center or a distributed data center or centers which would allow the capabilities of the interactive management software to be delivered to users without requiring the physical installation of new software or hardware at the user site.

One such approach is commonly referred to as an Application Service Provider ("ASP") model. The data center or combination of data centers can provide the interactive communications capability to users over a network, whether a private data network, the internet, or an intranet. In time, some of these services may be deployable at the edge of the network, closer to the user.

In these services, all the control software that allows for effective interactive communications are provided through a switch (either physical equipment or software or both) at a location other than at the new user site. This makes it possible for the sponsor to add the new user to the interactive video service or on-demand communications service without having to add new hardware or software to the new user since all the interactive video capabilities are provided through services at the switch, server or data center. Depending on the service, some software may be downloaded to the user from the site of the service provider to enhance interactivity.

In an example, a prospective new user of the on-demand communications system is invited to join the network. The prospective user joins by connecting to the internet or intranet at the address provided by the inviting party. The user is provided with a way to log into the network and use any means of identification and security that the network sponsor is prepared to provide.

Once the prospective user is at the correct website or its equivalent, the website provides information to the prospective user outlining the specific steps that are required to enter the interactive communications website. If necessary, the interactive communications website offers to download any required software to the prospective user to participate in a managed communications environment. Because the software required to participate is built into the data center or network center and can be transferred through the web connection, the user would not need any special equipment or locally loaded software to participate. The sound and video capability of the user's computer is sufficient. Additional sponsored services can also be offered to the user at the same time, such as free or sponsored phone services.

The third step is to provide capabilities for the new user or his programs or computer or telecommunications agents to share information with the emergency services network. This is accomplished through means such as web portals or information request agents. Web portal software modules or information request agents make it possible for sponsors or paying participants of an emergency services network to provide data and services from software programs or databases to users who do not have those programs or databases installed in their own systems. New users can receive information from the web portals or information request agents or provide information to the web portals without having any special software of their own since the portion of the data being shared is posted to or taken from a web site that does not require the use of the underlying software program or database. Participation is a matter of being provided access and authorization by a sponsor and can be done as quickly and immediately as the sponsor identifies and authorizes the user. The programs or databases or services can be offered to sponsored users who do not have the ability to pay for the emergency services in a timely manner. However, the users can be added to an emergency services network in real-time since additional software or hardware is not needed for each new user and the user does not need to be able to pay before being included into the network.

A fourth optional step makes it possible for the sponsors to allow, authorize, and provision participation of the new and unexpected user, so that the user is immediately included in the network infrastructure without requiring the user's ability to pay. For example, if the user already has some wireline or wireless capability to access one network, the sponsor can authorize that new and unanticipated user to join a new or different wireline or wireless network that might provide additional capabilities or a different infrastructure for network reliability and disaster recovery purposes. This may require an assessment of the network, or the servers and mass storage that are supporting the application by the ASP in which the appropriate server capability is assessed, provided, and, as necessary, billed to the sponsoring party. Also, the sponsor may issue temporary "passes" to the network that are maintained in the database and used to track the sponsored services.

Figure 12:
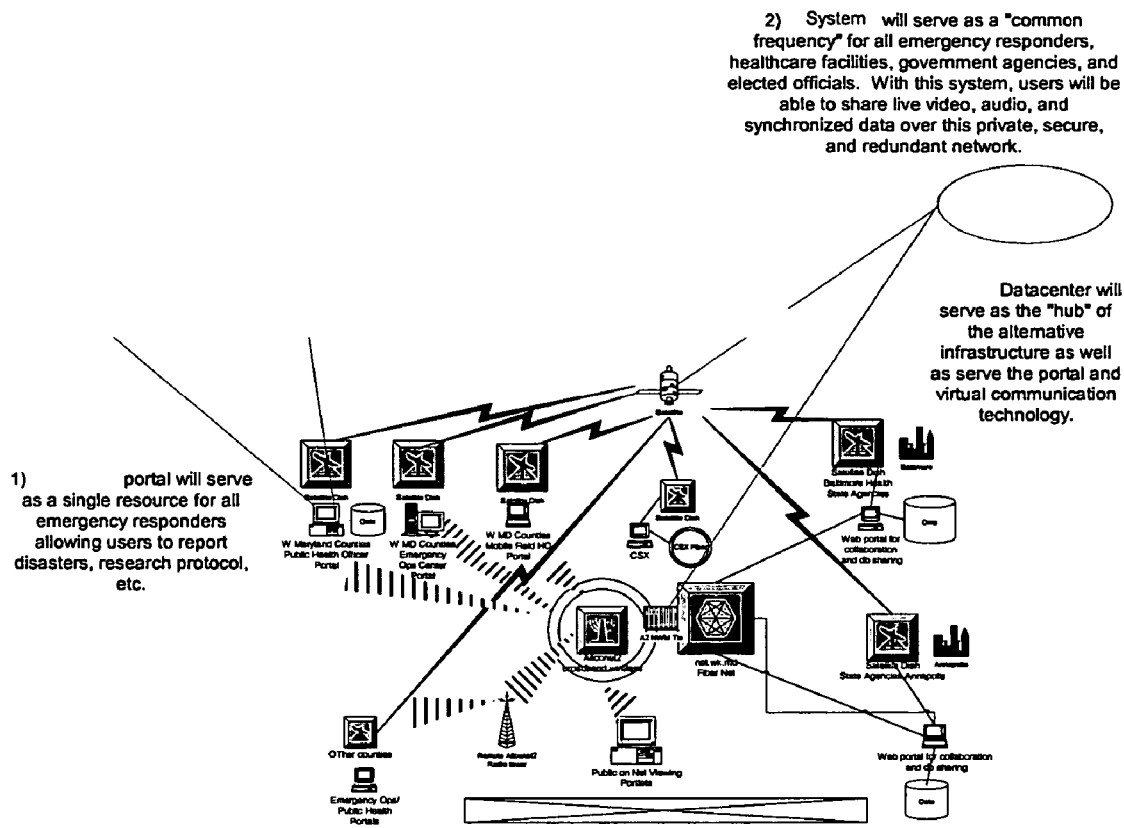
FIG. 12 is an illustration of on-demand communications that provides people, organizations, and or governments immediate on-demand participation in interoperable communications and services, such as those used for emergency services.

FIG. 12 illustrates these four steps where a user has a computer, whether stationary or mobile, that can be added to the network with whatever network connectivity the sponsor may wish to authorize (wireline, wireless, or satellite) and pay on behalf of the new user. Sponsors and users do not have to wait for new customer premise equipment to be added or for the user to find the financial resources to participate.

Figure 9:
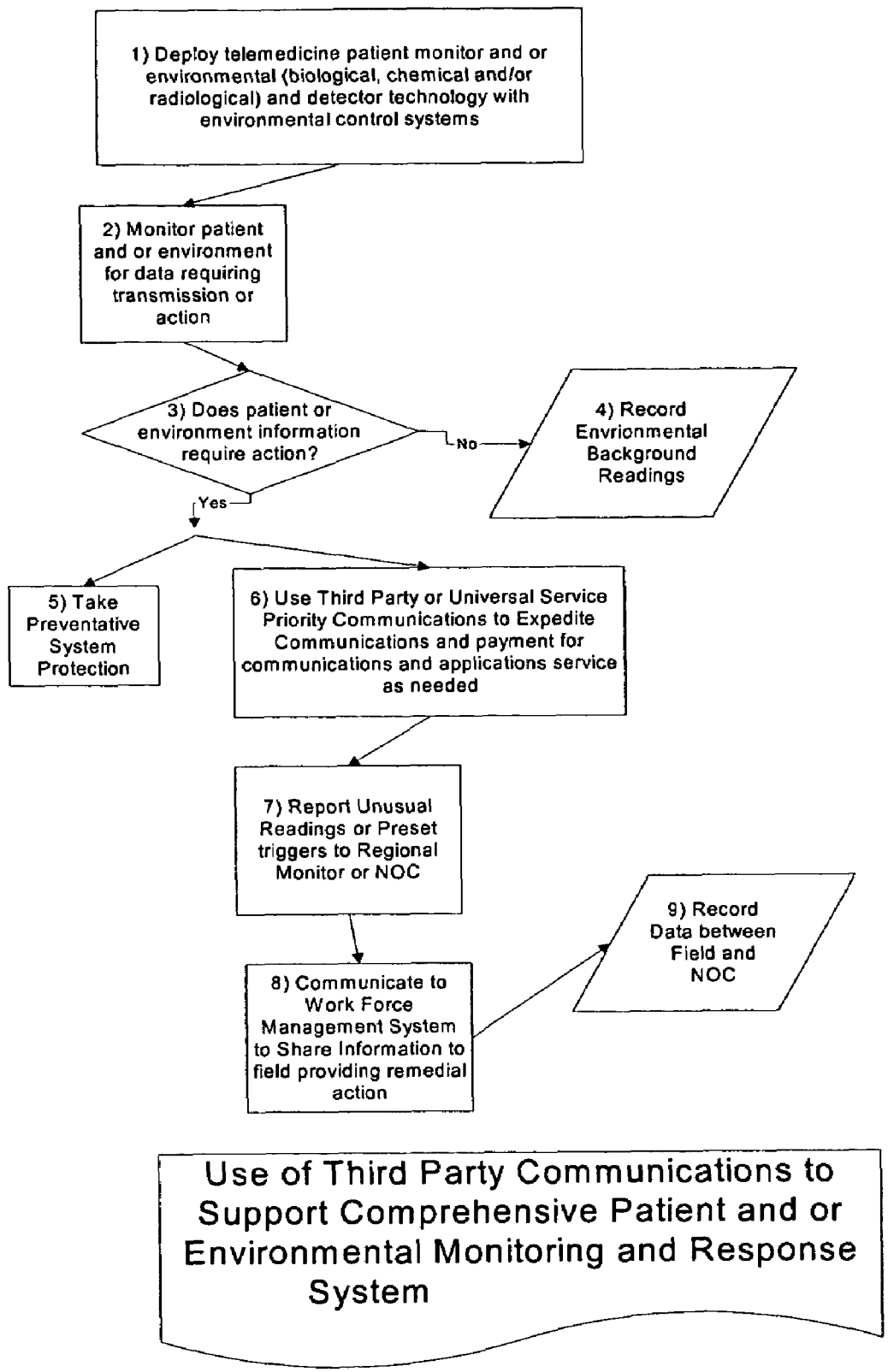
FIG. 9 is flowchart of the process of monitoring a person or their environment so that triggering events can initiate sponsored communications.
Figure 10:
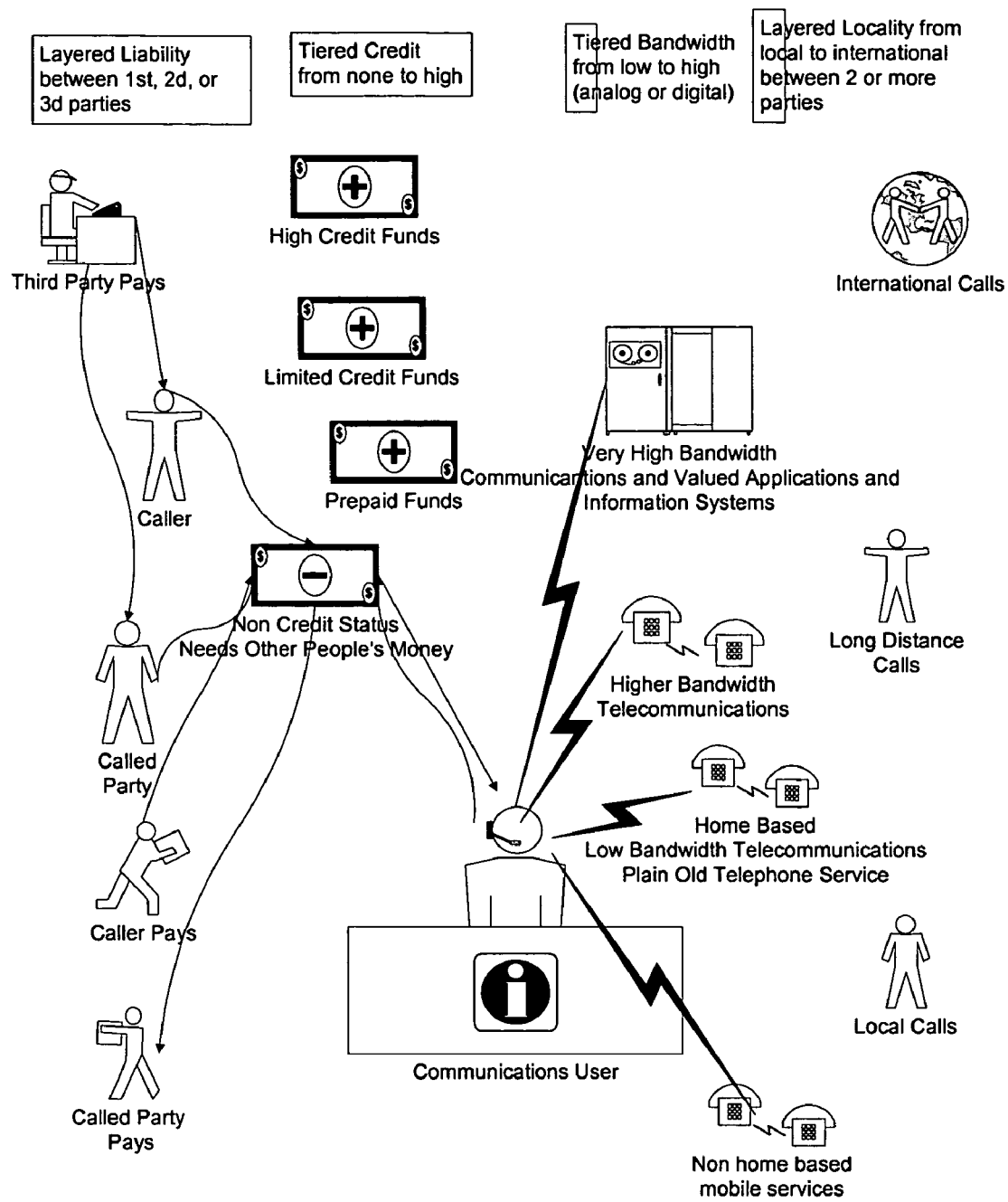
FIG. 10 is an illustration of the layers or levels of universal service that can be provided by the invention.
Figure 11:
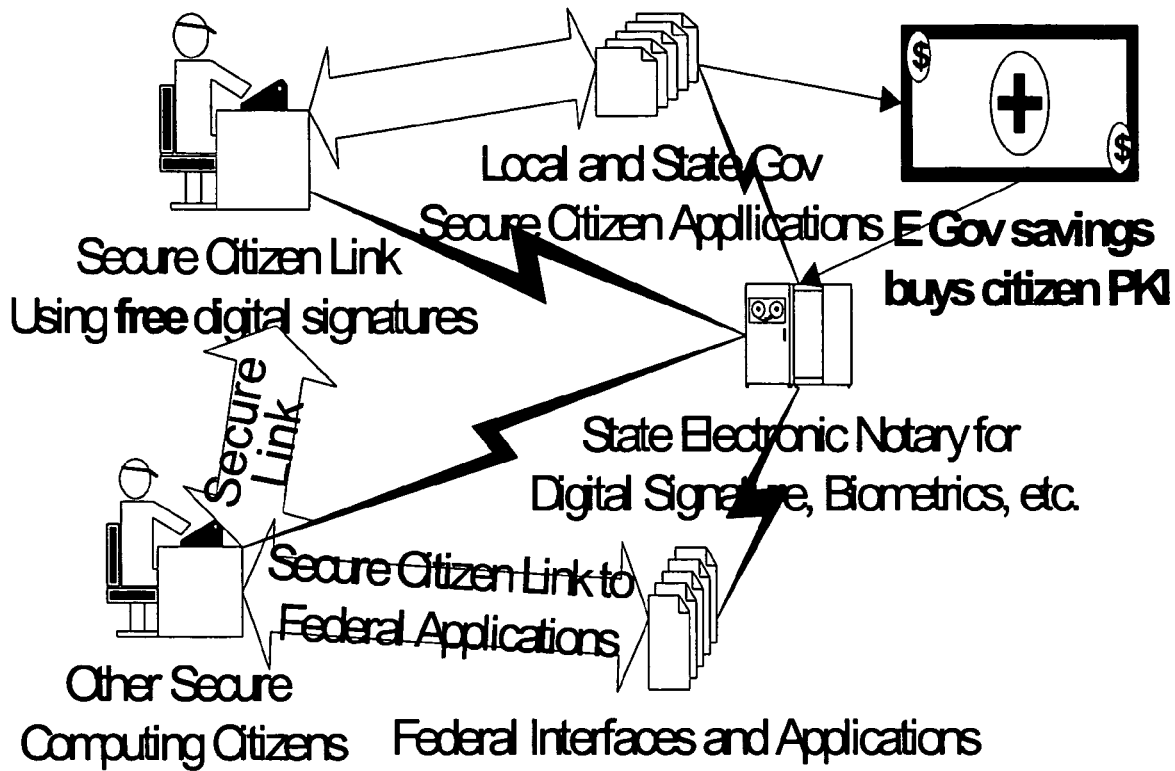
FIG. 11 is an illustration of free security services that can be provided by sponsors such as local governments and financial institutions so that public and private networks can be protected from malicious acts.

Since some users may not anticipate a need to participate in these emergency services networks, they may not know how to acquire and provision or have the resources to buy special software, hardware, or services that would allow them to participate in an emergency services network. By organizing a combination of emergency service capabilities that exist in an emergency services network and not in the user's own communications system, these users can be added immediately as long as sponsors can authorize the use of the new users. Because the sponsors can anticipate the need for new users, the sponsors can add the new users at will and in real time, as shown in FIG. 11. Referring to FIG. 9, new users can be added manually or automatically. New users can also be part of an identified group of users, such as an enhanced E-911 database, but without current communications services.

In some cases, a person's medical or environmental status change is monitored so that the change can trigger their addition to a sponsored user database or trigger authorization to use sponsored communications networks and/or services. This makes it possible to offer new telemedicine services to a sponsored patient so that new problems that arise would be understood through business rules as a triggering event creating a new service that the sponsor has agreed to pay. Similarly, a choice by the user of an approved piece of information or communication triggers the authorization of the sponsor for an additional service or piece of information that becomes relevant to the sponsor and user subsequent to the choice.

In another example, an intelligent transportation network system monitors road and visibility conditions. When the sensors or cameras show a decrement in road conditions or visibility, communications response is triggered. A signal changes the lighted speed limit sign to a slower speed limit so that drivers can be prepared to react to real-time road information, minimizing traffic accidents and fatalities. Alternatively, a community of users may receive enhanced broadband services that might not have been available to them prior to the weather or road conditions change, such as the availability of weather maps or prepaid services to board up or otherwise protect their properties or obtain free sources of potable drinking water.

Figure 13:
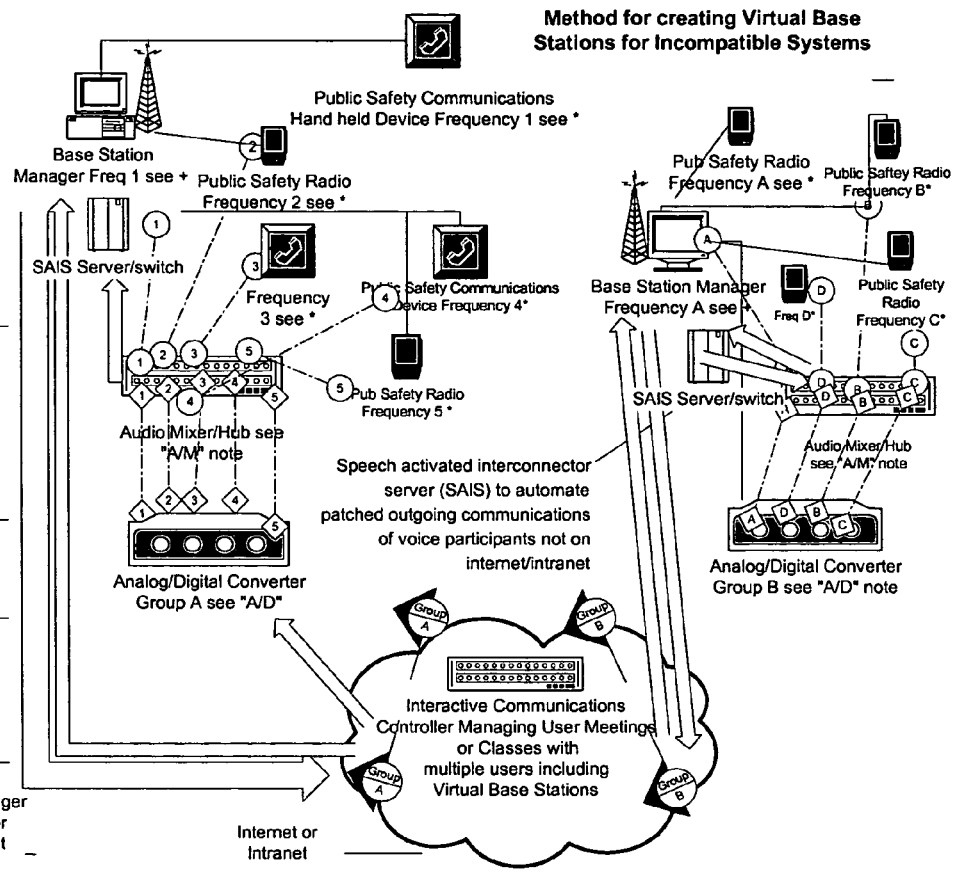
FIG. 13 is an illustration of how a user of incompatible communications systems can become a virtual base station providing compatible communications when combined with services over a network.

Any user in this on-demand communications network could become a virtual base station in which the user takes otherwise incompatible systems and integrates them into his own on-demand communications network, as illustrated in FIG. 13. This provides some level of interoperability even to those users who do not have internet network access themselves, allowing them to enjoy many of the benefits of the network that can be used by the virtual base station user.

In one embodiment of this invention, the user, or service provider of the user, takes the audio output of each of the incompatible communications systems, in any combination of radios or cell phones, either from a speaker to a microphone or from a speaker or headset jack into an audio mixer. Multiple audio inputs from various radios or cell phones can be connected to a device through which a user can control properties such as volume, quality of sound, etc. These signals are then connected to an analog/digital converter which enables these signals to be connected into the computer of the on-demand communications user. This provides additional management controls of those audio signals, and the ability to forward those signals either in combination or separately as his own audio input into the larger interactive voice, data, and video communications system that comprises the on-demand communications system. This allows for the similar aggregation of video inputs through video mixers and analog/digital converters.

Figure 14:
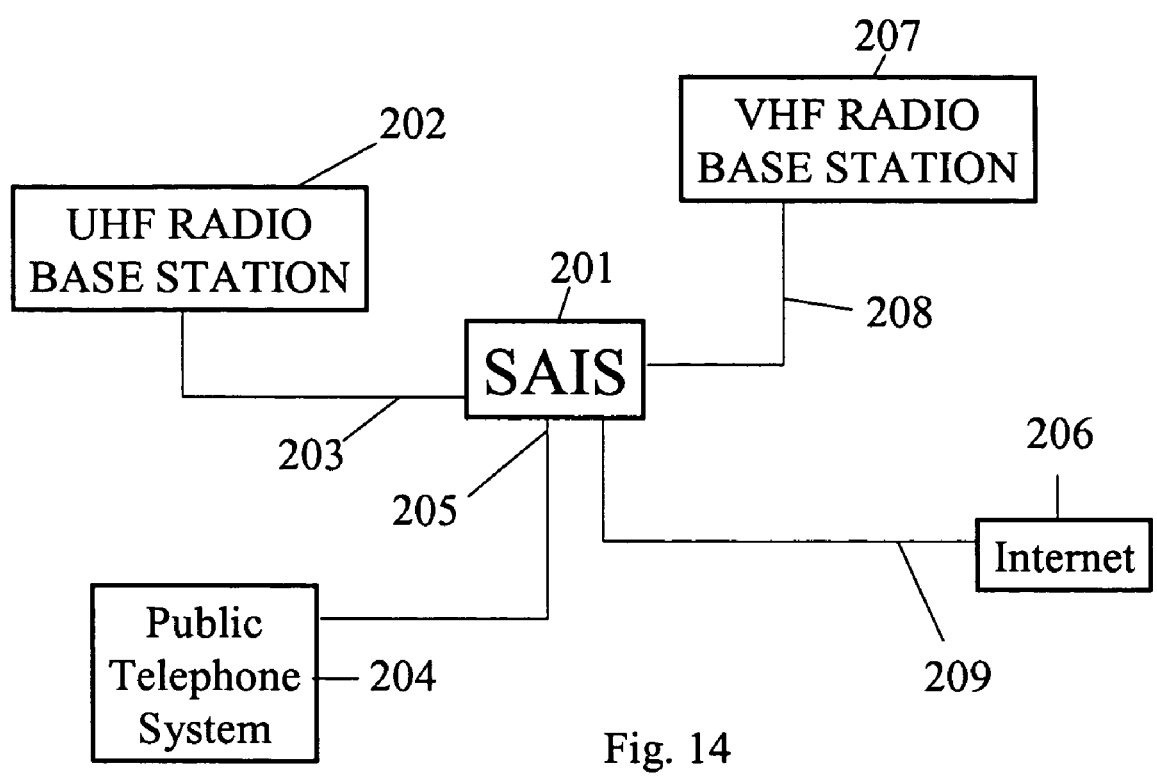
FIG. 14 is an illustration of connectivity to the SAIS.

In an example, different police and fire departments in a region have different frequencies over which their communication systems operate. FIG. 14 shows radio base stations 202 and 207 operating in different frequency bands. The on-demand communications user may have access to multiple incompatible systems. The user can take the audio input from all of these systems along with his own so that others in the on-demand communications network can hear what the on-demand communications user is communicating with those on otherwise incompatible radio systems, and so that another person using one radio system can hear both the virtual base station manager and those with whom he is communicating through the on-demand communications network. This would allow users on different systems to, in fact, communicate with each other whether they are local or distant.

The virtual base station manager is able to communicate back to each participant of the incompatible networks who are not on the on-demand communications network using any means allowed by the incompatible network device, either manual or automated, depending which user or base station capabilities are available from that incompatible system. The virtual base station can be located either with a remote user or at the base station. Since the base station operators of the incompatible radios will also receive the audio signals sent to them by the on-demand communications system, they have those audio signals forwarded to the users of the specific incompatible radio through the normal means afforded to them by their base station manufacturer, as shown in FIG. 13.

Optionally, individual radio users have a voice activated means to request a connection to another radio frequency system so that the base station operator does not need to intervene. The voice-activated connection to otherwise incompatible systems is described below and illustrated as the Speech Activated Inter-connector Server ("SAIS") in FIG. 13. The SAIS can stand alone as an automated means to connect incompatible voice systems. FIG. 14 shows connection 203 from radio base station 202 to SAIS 201. This connection 203 may be a two-wire landline. Another base station 207 is connected via connection 208, which may be a four-wire dedicated line that is incompatible with connection 203. The Internet 206 is connected to the SAIS via connection 209, which may be a high speed digital connection, unlike connections 203 and 208. The connection to the public switched telephone network 204 may be via a T1 carrier, again incompatible with connections to other types of systems connected to the SAIS.

The user interface with the SAIS can be tone-activated or speech-activated and provides a means to support the portion of the on-demand communications participants that do not have access to internet protocol based communications.

The SAIS is a full fanout switch that allows one to make discreet connections to one or many simultaneous connections (e.g., conference calls) with others who may not have internet or intranet capabilities. The full fanout switch capability of the SAIS can act as multiple mixers using a programmable switching matrix with low audio input impedance and high output impedance followed by an impedance converter. Voice signals can also be converted to digital format prior to the matrix for ease of digital mixing. The SAIS switch can connect any input, or group of inputs, to any combination of outputs (hence, full fanout). Additionally, an echo canceller is used on each input so that the speaker does not hear himself.

The speech activated interconnector portion of the invention enables interconnection of multiple dissimilar voice communication systems without the need for human operator intervention. The end user simply voices a connection request over the audio connection to the SAIS. The SAIS dialogs with the user using speech recognition, a table of user authorities, and timeout features for disconnection. The process enables rapid connections between systems, which can significantly enhance operations in an emergency.

Participating systems interface at the analog voice level, the "least common denominator" of all human voice communication systems. Interfacing at this audio level eliminates many of the incompatibility issues common to such system integration efforts.

The present invention provides for the integration of radio stations in a preprogrammed system that can be voice activated and controlled via end user speech. The system eliminates operator intervention and bypasses the difficulties of integrating dissimilar systems by interfacing at the audio point, the "least common denominator" of all voice systems.

The operator intervention requirement is bypassed by programming a central switch or similar interconnection point that responds to voice instructions from the end user. In this approach, speech recognition is used to monitor all audio connections to participating systems. Using spoken security codes, the user accesses the switch and performs interconnections for which that user is authorized. Speech analysis may or may not be used to identify the actual speaker supported within the SAIS.

The digital system complexities, such as transmission packet protocols used on digital voice systems, are bypassed by making all user system interconnections using audio in analog or digital format. Audio is the "least common denominator" that allows the most sophisticated digital system to interface with the most antiquated analog system. By definition, every voice system has an analog signal point in order for a human to hear the signal. The speech activated interconnector invention is interfaced at the analog signal point.

In a speech activated interconnector invention application, multiple voice communication systems are connected to the SAIS or speech managed server. The SAIS interconnects multiple voice systems that may not otherwise be interoperable. The SAIS interfaces with various voice systems at a basic level, and nominally, the analog voice level. In this regard, all voice systems are analog at one point or another in order for humans to be able to listen. An analog point for most radio systems exists at a base station where voice traffic is normally received or distributed. The base station may use an external voice grade wireline connection to a remote location or have an operator position using an analog microphone and speaker/headset. In either case, a sample of the analog voice signal can be passed to the SAIS via landline or other convenient path. A return path from the SAIS is bridged onto the voice circuit in the reverse direction at the same point.

For cost effectiveness, all voice signals can be converted to digital format, e.g., 64 kbps PCM, at the interface with the SAIS. This allows all circuit connections and speech recognition related functions to be done digitally under software control.

SAIS interfaces with other systems and supports passage of control functions that simulate the normal operation of those systems as required. In some cases, this involves use of a simple pair of wires used to activate a push-to-talk ("PTT") function at a base station. In the return direction, the link can pass carrier detect signals of a radio system to the SAIS. Where a system requires more complex command and control functions, the SAIS is programmed to simulate the required data signals.

Interfaces with systems may use a simple pair of wires or 2 wire loop. Others require 4-wire interfaces, 4-wire E&M, LAN, WAN, or radio link connections. The commonality of all the interfaces is voice plus signaling required to establish end-to-end voice connection between end users.

The SAIS interconnects systems by cross connecting receive paths from one source with the transmit lines of another and visa versa. The uniqueness of SAIS is the way the process is executed. Cross connections are done in response to voice commands from end users. To perform the required operations, the SAIS monitors the voice circuits from all the systems connected to it.

SAIS is a "standby capability" that allows connected systems to operate independently until a user desires service. That is, the SAIS simply monitors the voice traffic for code words or other forms of command and control signaling when not being used. When a user wishes to be connected to another system, the user verbalizes a unique word. That word could even be a name of a person or location that is maintained in either a permanent or ad hoc database of such words. When the SAIS detects this unique word, it begins an interaction with the user. Using a series of passwords and prerecorded voice challenges, the SAIS interacts with the user to establish a desired connection. The system administration portion of the invention allows either a specified or default period of time to allow the connection to stay up or a voice code to end the connection.

By using human speech as a single means of communicating commands and controls, the SAIS is compatible with the simplest analog systems as well as more advanced technology based systems. This enables interconnection between otherwise incompatible voice systems. The SAIS can also be programmed to detect and process signaling such as DTMF, subaudible tones, and other types to electronic signaling commonly used.

The SAIS creates end-to-end circuits by cross connecting voice circuits to/from different voice communication systems. To achieve such connectivity, the SAIS simulates the control procedures of each system to establish the link and to terminate "calls." The SAIS can also bridge multiple voice connections to form a conference connection, if particular participants allow such connections. To ensure operational acceptance by end users, the SAIS is programmable to allow and/or restrict access to connections by other based on user permission levels.

The SAIS is designed to manage multiple voice connections that are established dynamically under user control. Connections are allowed according to multiple decision factors such as identify of the user, user's level of authority, and system access privileges. For example, a fireman may have access to other firemen, police, and EMS personnel in the field (personnel using handheld radios), but not have access to the public telephone system via connections to the SAIS. The fireman may also have access to voice lines to the fire station as well.

Participating organizations can establish a variety of procedural limitations and access controls to protect their systems. Participants also have the ability to activate and abort connects to the SAIS as desired.

Each user must be given access control codes or password(s) to be eligible to participate. The user registration process is initiated by a participating organization. The organization provides the SAIS administrator with names of users as well as levels of access allowed for each user. The user's password can be generated by the organization. For security purposes, the initial password can be used as a temporary password, which is replaced by the user when first registering online. If multiple users use the same password, the SAIS can distinguish users with its speaker recognition software or automatic location information. It should be noted that this system is intended for voice communications although other forms of signals may pass through connections formed via the SAIS. The level of security required should be commensurate. A simple voiced password should be sufficient.

Assuming a user has been registered on the SAIS, the user can access the system over any of the systems through which the user is authorized. The first step is for the user to verbally announce a pre-registered password. The SAIS recognizes the password using speech recognition software. This begins a series of transactions that establish the connection desired by the user.

There are multiple call establishment processes that the SAIS can be programmed to follow depending on the type of system being interfaced. For example, SAIS first sends a short tone burst, voice message, or announcement to the user. The tone may be used by the SAIS to turn on a base station transmitter or perform other activation processes that are specific to the link to the user. The user hears the burst or voice messages and is prompted to repeat the password within a preset amount of time. This burst-timed response procedure is used to filter out false password detection by the SAIS.

When the second announcement of the password has been detected by the SAIS, the SAIS provides a list of options or tree of options in a manner similar to an automated PBX. The user can bypass the announcements by speaking codes for access to connections desired. For example, if a user wishes to speak to EMS personnel at a particular location, the user may say "EMS 5." EMS 5 would be a standard connection option at the SAIS for that authorized user. Alternatively, the user can say "5," accessing a connection preconfigured connection table specific to that user. The user can also say "Last" (or similar wording) which causes the SAIS to establish the last connection that user had active. That connection may have been initiated by another user, but the SAIS keeps a record of al transactions and can re-establish the linkage.

The option tree available to the user is constructed in advance by the SAIS administrator as directed by the participating organization. Multiple levels in the tree are available for each user. Users soon become familiar with the tree contents and can exit the tree at will using the appropriate verbal commands.

For security reasons on some systems, speaker verification may be required. This can involve additional levels of password as well as voice pattern recognition by the SAIS. Training of the SAIS for voice pattern recognition is conducted at the time of registration and involves use of the transmission device intended. For example, a policeman speaks over his radio to the SAIS announcing a specific set of words selected to train the SAIS. The same words are used subsequently to authenticate the user over the radio. The same user re-registers over other instruments independently to access the system over those devices. In other words, if a user is also allowed to access the system over a different radio system or type of radio, speaker recognition training may be required over that other radio or system. This reduces the number of false positive recognitions by limiting the voice pattern matching process to a smaller set of patterns. The integrity of the speaker recognition process improves by also requiring the correct password(s) and restricting the word patterns used for matching to those associated with a specific system or radio link.

Once a valid connection request has been established via the SAIS, the SAIS bridges the calling party's voice circuit to the called party and signals or otherwise activates the link to the called party. This may involve ringing a phone, turning on a base station, or broadcasting an alert function on some device. The details of the steps taken by the SAIS depend on the technical and operational requirements of connected systems.

Participating organizations can have the SAIS programmed to issue caller ID information to the called party. This can be done using industry standard tones, user system specific protocols, or programmed audio announcements.

The connection made at the SAIS can be terminated in several ways. A SAIS timer can be used which can be based on a fixed period or a period of silence. If two systems communicate through the SAIS, the system can be programmed so the shorter timeout period prevails.

Users have the option of forcing a termination by announcing a unique codeword such as "Break SAIS." Termination is confirmed audibly to the users at both ends by the SAIS with words such as "Connection is now terminated."

A connection can also be terminated by the SAIS administrator or by system operators of the systems being interfaced at the SAIS. Some systems will provide a termination signal such as a telephone going on hook. When connections involve PTT functions, the termination timer can be based on periods of inactivity of the control leads involved.

Figure 15:
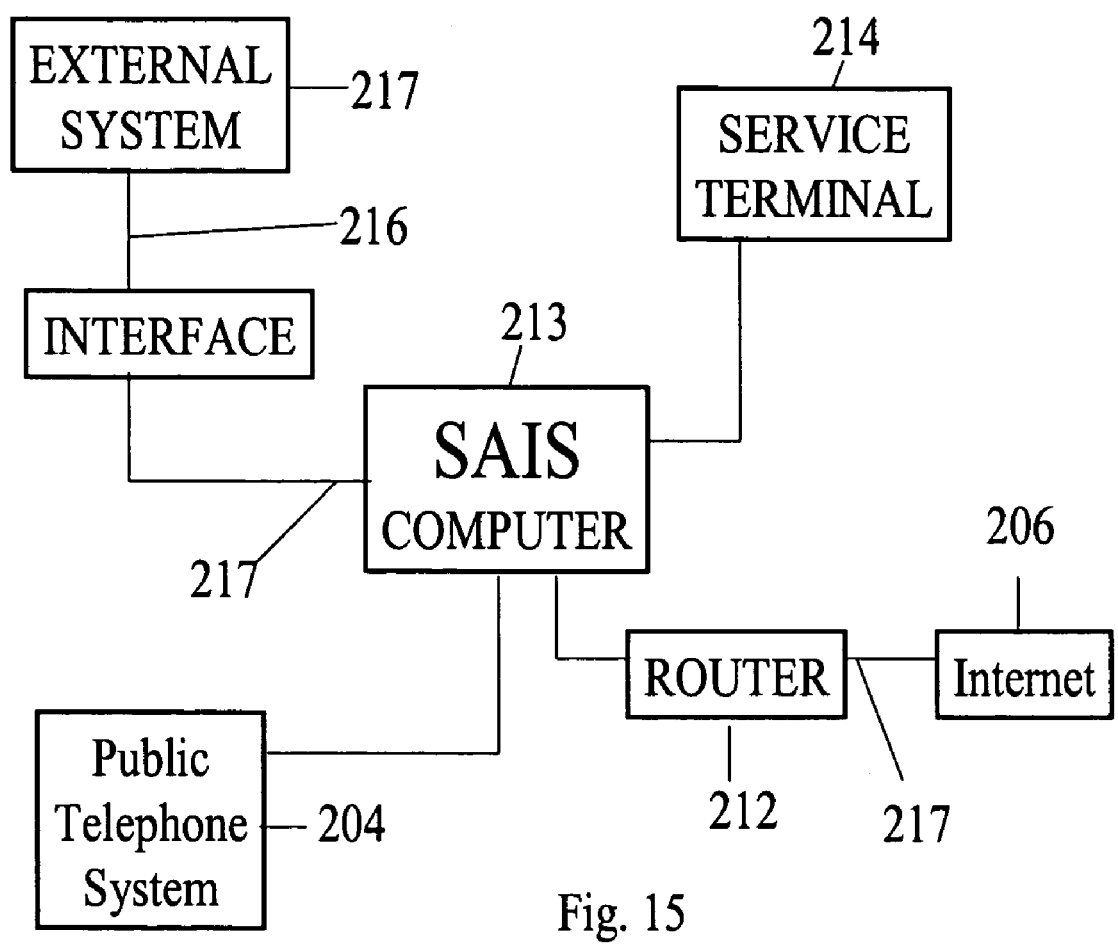
FIG. 15 is an illustration of the functionality of the SAIS.

FIG. 15 illustrates the architecture of the SAIS system according to an embodiment of the present invention. The SAIS will include a computer 213 which houses standard hardware and the system's programming. A local terminal 214 is used for direct access to the SAIS computer for programming and maintenance. Similar access is provided via the Internet 206 via connection 217 to a router 212 or the public telephone system 204 using dial-up circuits. This allows end user organizations to secure access to the SAIS computer for managing access control parameters for users. External communications systems 217 that require connection to the SAIS will invariably require one form of conversion or another to interface with the SAIS. Interface unit 214 provides the required electrical and protocol conversions required to meet the minimum requirements of interfacing with an SAIS port 215. These requirements include a means to placing outgoing calls or call signaling, receiving incoming calls, carrying voice in both directions, and actual or simulated control signals that may be required by the external system to operate. Router 212 in FIG. 15 performs numerous industry standard functions including intrusion detection and firewall functions.

The security features of external systems, such as encryption of a radio path, are no longer in effect when the voice signal is converted to a format suitable to interface with the SAIS. End-to-end connections that must remain encrypted will require re-encryption on all links to which the user is connected.

The consequences of unauthorized access to the system will vary depending on the sensitivity of the participating organizations to unwanted traffic. System participants that allow conferencing are more likely to experience intrusion whereby unauthorized detection of traffic is enabled. The primary result of unauthorized access may be interference with operations. For example, a fireman climbing a ladder during an emergency would not want a nuisance call on his radio. To reduce inappropriate use of the system, each user, each system, and each link to/from the SAIS is configurable to restrict access to specific users, systems, or links. Likewise, call durations can be restricted by user, system connection, or link.

Participating organizations may optionally require that users attempting to access their system via the SAIS be required to provide additional password(s). The SAIS is programmed to manage such activity on behalf of the organization.

The SAIS maintains a record of the user name and encrypted copy of the password. Deletion of the user name from the system causes the SAIS to delete the password from the system.

The SAIS can be scheduled to expire user passwords periodically. Users would be required to re-register as noted above or conduct an "over-the-air" password change process before a password expires. Announcements of pending expirations can be announces to users by the SAIS in advance when users are available.

FIG. 16 illustrates the interactive nature of the sponsor, user, and service provider either by direct contact or through an approved database of business rules or both. In this case, a patient or prisoner is being monitored for health or behavior through a sponsor approved monitoring routine (in step 1). However, as in typical insurance plans, a heart specialist may not be approved until a heart condition warrants a specialist's review or intervention. Or, in the case of a prisoner, the change of health or prisoner location may trigger an alarm and activate additional communications links with the prisoner who may have area or tethered personal communications links on his person. As in the case of step 2, a new heart condition arises. In step three, the new condition service routine compares the new condition with the database of business rules and conditions to see whether a new service now being requested is already approved and in the database of approved services. Step 6 shows the decision tree showing if approved, the service is provided and the database is updated (step 12) as required, but, if not, then step 7 suspends approval and begins the sponsor contact routine (step 8) through any of the approved methods, such as email, page, phone call, video transmission, etc. Once the sponsor is reached, a decision is requested in step 9. If the sponsor approves, then the service is provided (step 6) and the database is appropriately updated (step 11). If the sponsor does not approve, then the new service is not authorized (step 10) and the database is appropriately updated (step 11).

The approval of the sponsor may be simple or complex as in a database of business rules or complex conditions. Also, the sponsor can be reached to update the decision given new circumstances. This makes it possible to maximize the value and efficiency of on demand communications for many applications from telemedicine to emergency services. In turn, these sponsor provided services provide sufficient economic incentives for the development of new communications infrastructure rather than only providing incentives to create incremental additional services.

While the invention has been described in detail and with reference to specific embodiments thereof, it will be apparent to those skilled in the art that various changes and modifications can be made therein without departing from the spirit and scope thereof. Thus, it is intended that the present invention cover the modifications and variations of this invention provided they come within the scope of the appended claims and their equivalents.

What is claimed is:

1. A method of operating a telecommunications device comprising the steps of:
   detecting an incoming call or data message from a calling party to a called party;
   using a called number or identifier to determine whether said called party is a universal service user for whom service is provided at no charge or substantially no charge;
   generating and sending a message to said calling party offering participation as a sponsor party for the current and subsequent calls for said universal service user; and
   using codes and speed dial numbers for allowing calling party access only to said called party allowed by the sponsor party to be contacted and only using said service provided to said universal service user by the sponsor party.

* * * * *